(12) United States Patent
Toya

(10) Patent No.: US 7,683,572 B2
(45) Date of Patent: Mar. 23, 2010

(54) BATTERY CHARGING CRADLE AND MOBILE ELECTRONIC DEVICE

(75) Inventor: Shoichi Toya, Minamiawaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 158 days.

(21) Appl. No.: 11/979,790

(22) Filed: Nov. 8, 2007

(65) Prior Publication Data

US 2008/0111518 A1    May 15, 2008

(30) Foreign Application Priority Data

Nov. 10, 2006   (JP)   ............................. 2006-305757
Aug. 29, 2007   (JP)   ............................. 2007-222844

(51) Int. Cl.
*H02J 7/00*   (2006.01)
(52) U.S. Cl. .................. 320/108; 320/112; 320/113
(58) Field of Classification Search ................ 320/108, 320/107, 112, 113
See application file for complete search history.

(56) References Cited

U.S. PATENT DOCUMENTS

| 4,031,449 A | * | 6/1977 | Trombly | ...................... 320/108 |
| 5,550,452 A | * | 8/1996 | Shirai et al. | .................. 320/108 |
| 5,959,433 A | * | 9/1999 | Rohde | ......................... 320/108 |
| 6,016,046 A | * | 1/2000 | Kaite et al. | ................... 320/108 |
| 6,040,680 A | * | 3/2000 | Toya et al. | ................... 320/108 |
| 6,316,909 B1 | * | 11/2001 | Honda et al. | ................. 320/108 |
| 7,263,388 B2 | * | 8/2007 | Yamamoto | .................... 455/573 |
| 7,414,380 B2 | * | 8/2008 | Tang et al. | ..................... 320/108 |

FOREIGN PATENT DOCUMENTS

JP   3011829   3/1995
JP   9-63655   3/1997

* cited by examiner

*Primary Examiner*—Patrick J Assouad
*Assistant Examiner*—Richard V Muralidar
(74) *Attorney, Agent, or Firm*—Wenderoth, Lind & Ponack, L.L.P.

(57) ABSTRACT

A battery charging cradle and mobile electronic device include a battery charging cradle incorporating a primary coil which induces an AC magnetic flux to a specific portion of a planar, top plate of the cradle, and a rechargeable battery incorporated inside a bottom plate and charged by electric power which is induced to a secondary coil being electromagnetically coupled to the primary coil. The battery charging cradle has a positioning portion, so that the mobile electronic device is placed in a predetermined position by means of the positioning portion, the primary coil is electromagnetically coupled to the secondary coil, and thus the rechargeable battery incorporated in the mobile electronic device is charged.

14 Claims, 12 Drawing Sheets

BATTERY CHARGING CRADLE AND MOBILE ELECTRONIC DEVICE

BACKGROUND OF THE INVENTION

1. Field of the Invention

The present invention relates to a battery charging cradle and mobile electronic device, where the mobile electronic device is placed on the battery charging cradle so that electric power is carried from the battery charging cradle to the mobile electronic device by an electromagnetic induction effect to charge a rechargeable battery incorporated in the mobile electronic device.

2. Description of the Related Art

A battery charging cradle and mobile electronic has been developed in which electric power is carried from a primary coil to a secondary coil by the effect of an electromagnetic induction to charge a rechargeable battery. Refer to Japanese Patent Laid-Open Publication No. H09-63655 (1997) and Japanese Utility Model Registration No. 3011829.

Described in Japanese Patent Laid-Open Publication No. H09-63655 (1997) is a structure in which the primary coil excited by an AC power source is incorporated in the battery charging cradle and the secondary coil being electromagnetically coupled to the primary coil is incorporated in a battery pack. The battery pack also incorporates a circuit in which an alternating current induced to the secondary coil is rectified and supplied to charge the rechargeable battery. In accordance with such structure, the battery pack is placed on the battery charging cradle so that the rechargeable battery incorporated in the battery pack can be charged in a non-contact state.

Also described in Japanese Utility Model Registration No. 3011829 is a structure in which the battery is incorporated at the bottom of the mobile electronic device, and further a secondary-side charging adaptor is subjacently provided so that the secondary coil and a charging circuit are incorporated in the secondary-side charging adaptor. Also described is a structure that the primary coil being electromagnetically coupled to the secondary coil is provided to the battery charging cradle. The mobile electronic device connected to the secondary-side charging adaptor is placed on the battery charging cradle, and the electric power is carried from the primary coil to the secondary coil to charge the rechargeable battery incorporated in the mobile electronic device.

SUMMARY OF THE INVENTION

Japanese Patent Laid-Open Publication No. H09-63655 (1997) presents a drawback that when the battery pack is out of alignment on the battery charging cradle, the battery pack cannot be charged. This is because when a relative position between the mobile electronic device and the battery charging cradle is out of alignment, the primary and secondary coils are not electromagnetically coupled to each other, so that the AC electric power cannot be carried from the primary coil to the secondary coil. Such drawback can be remedied, as described in Japanese Utility Model Registration No. 3011829, by providing a positioning protrusion to the battery charging cradle and also providing a positioning recess to the mobile electronic device, for the positioning protrusion to be fitted in the recess. In such a structure, the positioning protrusion is guided into the positioning recess, and the relative misalignment can be avoided between the mobile electronic device and the battery charging cradle.

The structure shown in Japanese Utility Model Registration No. 3011829, however, presents a drawback that a portion of the secondary-side charging adaptor cannot be made thin enough because the positioning recess is provided to a case bottom and the secondary coil is disposed upon the positioning recess. Since the mobile electronic device such as a mobile phone is required to be made as thin as possible, an increased thickness caused by the positioning recess presents a drawback that a convenient portability is spoiled.

The present invention has been made in order to remedy the above-mentioned drawbacks. It is the primary object of the invention to supply a battery charging cradle and mobile electronic device, where while the mobile electronic device is made thinner, the mobile electronic device is placed on the battery charging cradle in an accurate position, so that the incorporated battery is allowed to be recharged in a positive and stable manner.

The inventive battery charging cradle and mobile electronic device include a battery charging cradle 10, 70 which incorporates a primary coil 11 being connectable to an AC power source 15; and a mobile electronic device 20, 60 which is provided with a secondary coil 21 being electromagnetically coupled to the primary coil 11 of the battery charging cradle 10, 70 as well as with a rechargeable battery 31 which can be charged by electric power induced to the secondary coil 21. The battery charging cradle 10, 70 has a planar, top plate 12, 72 on an upper side, on which the mobile electronic device 20, 60 is detachably mounted, and also incorporates the primary coil 11 so that an AC magnetic flux is induced to a specific portion of the top plate 12, 72. The mobile electronic device 20, 60 has a planar, bottom plate 22, 62 to be placed on the top plate 12, 72 of the battery charging cradle 10, 70, and also has the secondary coil 21 disposed inside the bottom plate 22, 62. The secondary coil 21 is a coreless, planar coil in which a wire material is spirally wound in a planar manner. The secondary coil 21 being the planar coil is disposed inside the bottom plate 22, 62 in a parallel relationship with respect to the bottom plate 22, 62. The battery charging cradle has a positioning portion for arranging the mobile electronic device in place, so that the mobile electronic device is placed, by means of the positioning portion, at a predetermined position of the top plate of the battery charging cradle, that the primary coil 11 is electromagnetically coupled to the secondary coil 21, and that AC power is supplied from the primary coil 11 to the secondary coil 21. In this way, the rechargeable battery 31 in the mobile electronic device is charged.

The above-described mobile electronic device can be placed in an accurate position of the battery charging cradle so that the incorporated rechargeable battery is charged positively and stably.

The positioning portion can be the positioning protrusion 14, 74 which is provided to the top plate 12, 72 of the battery charging cradle 10, 70. The mobile electronic device 20, 60 is provided, at the bottom plate 22, 62, with the positioning recess 24, 64 which is fitted to the positioning protrusion 14, 74. The planar coil being the secondary coil 21 is arranged such that its central coiling diameter is larger than the inner diameter of the positioning recess 24, 64, that a hollow portion 26 is provided in the center of the planar coil, and that the positioning recess 24, 64 is provided in the hollow portion 26. The positioning protrusion 14, 74 of the battery charging cradle 10, 70 is guided into the positioning recess 24, 64 of the mobile electronic device 20, 60, the primary coil 11 is electromagnetically coupled to the secondary coil 21, the AC power is supplied from the primary coil 11 to the secondary coil 21, and thus the rechargeable battery 31 incorporated in the mobile electronic device 20, 60 is charged.

The above-described mobile electronic device has its incorporated secondary coil, as the coreless planar coil, disposed inside the bottom plate in a parallel relationship to each other, also has a winding diameter in the center of the planar coil to be larger than the inner diameter of the positioning recess, has the hollow portion in the center of the planar coil, and has the positioning recess disposed in the hollow portion. Such unique structure allows the mobile electronic device to dispose the secondary coil in a flush or coplanar relationship with the positioning recess. As such, while being structured so as to incorporate the planar coil and to guide the mobile electronic device to the positioning protrusion of the battery charging cradle in a predetermined position, the bottom surface of the mobile electronic device is made thin enough.

According to the present invention, the entire top plate 12, 72 of the battery charging cradle 10, 70 can be made planar.

According to the present invention, a geometric figure 59, 79, 99 can be given to indicate the positioning portion for the mobile electronic device 20, 60, 80 to be placed on the top plate 52, 72, 92 of the battery charging cradle 50, 70, 90. In the battery charging cradle 50, 70, 90, the mobile electronic device 20, 60, 80 is carried on the top plate 52, 72, 92 in alignment with the position for placement, so that the primary coil 11 is electromagnetically coupled to the secondary coil 21 to supply the AC power from the primary coil 11 to the secondary coil 21, for charging the rechargeable battery 31 incorporated in the mobile electronic device 20, 60, 80.

Also because the geometric figure is indicated, on the top plate in the above-described battery charging cradle, for indicating the position to place the mobile electronic device, users of the mobile electronic device are able to place their mobile electronic device in alignment with the position for placement as indicated by the geometric figure on the top plate, so that the primary coil is electromagnetically coupled to the secondary coil in a positive manner, for stably charging the rechargeable battery.

According to the present invention, the battery charging cradle 10 is able to incorporate a position sensor 16 for detecting a position for placement of the mobile electronic device 20, to make the position sensor serve as the positioning portion. In the battery charging cradle 10, the position sensor detects and indicates the position for placement of the mobile electronic device.

The above-described battery charging cradle incorporates the position sensor for detecting the position for placement of the mobile electronic device, and the position sensor serves to detect the position for the mobile electronic device to be placed. In particular, when the position for placement of the mobile electronic device is out of alignment with a proper position for placement, an alarm is delivered to notify a misalignment, so that the users are able to set the mobile electronic device to be free from the misalignment alarm, and then are able to stably charge the incorporated rechargeable battery by electromagnetically coupling the primary coil to the secondary coil in a positive manner. Further, according the present invention, when the position for placement of the mobile electronic device is appropriate, a normality indication is given; the users are able to place their mobile electronic device in a proper position while checking such normality indication, and thus the primary coil is electromagnetically coupled to the secondary coil in a positive manner, for stably charging the incorporated rechargeable battery.

According to the present invention, the position sensor 16 detects any one(s) of an electric current flowing through the primary coil 11, power consumption in the primary coil 11, a resonance frequency in the primary coil 11, and an impedance in the primary coil 11, so that the position of the mobile electronic device 20 can be detected by the position sensor 16.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
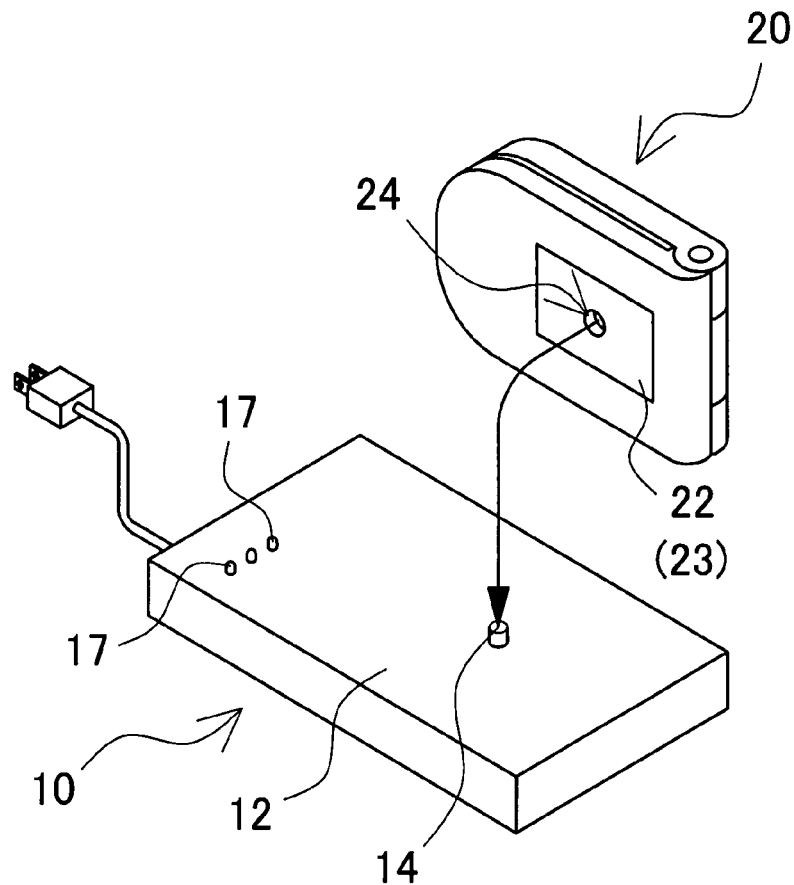
FIG. 1 is a perspective view of the battery charging cradle and mobile electronic device in accordance with an embodiment of the present invention.
Figure 2:
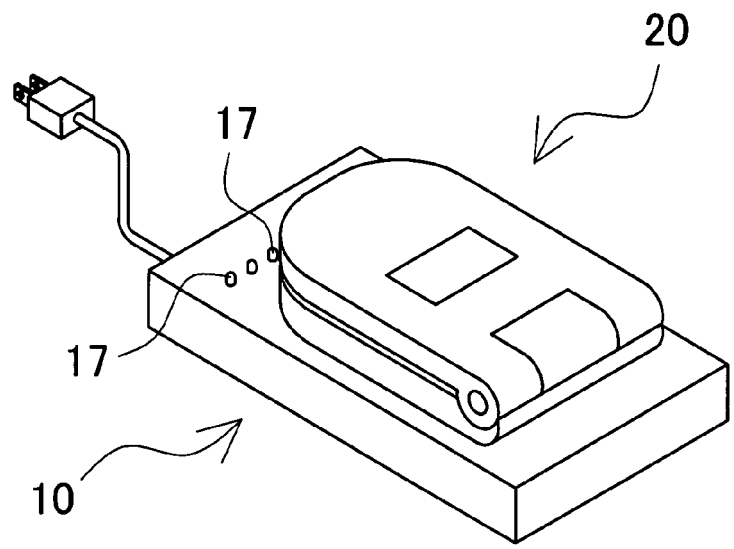
FIG. 2 is a perspective view showing how the battery charging cradle and the mobile electronic device illustrated in FIG. 1 are set up.

FIG. 1 through FIG. 6 show a battery charging cradle 10 and a mobile electronic device 20 that is placed on the battery charging cradle 10 to charge an incorporated rechargeable battery 31. The battery charging cradle 10 incorporates a primary coil 11 that is connected to an AC power source 15. The battery charging cradle 10 is provided, on its top surface, with a planar, top plate 12 on which the mobile electronic device 20 is to be detachably placed. In the illustrated battery charging cradle 10, the top plate 12 is planar in its entirety and is disposed horizontally. The battery charging cradle 10 allows a variety of mobile electronic devices 20 in different sizes and shapes to be placed on the cradle so that the incorporated rechargeable battery can be charged. The battery charging cradle, however, may also be provided with a peripheral wall on around the cradle, so that the mobile electronic device may be placed inside the peripheral wall so as to charge the incorporated rechargeable battery. The battery charging cradle may have a peripheral wall larger than the contour of the largest mobile electronic device to be placed on the top plate, so that a variety of mobile electronic devices may be placed on the cradle.

The battery charging cradle 10 has a primary coil 11 disposed on an interior surface of the top plate 12. The primary coil 11 is spirally wound on the surface which is parallel to the top plate 12, and induces an AC magnetic flux to a specific portion of the top plate 12. The primary coil 11 serves to induce the AC magnetic flux being orthogonal to the top plate 12 to a specific portion of the top plate 12. In the primary coil 11, an AC electric power is supplied from the AC power source 15, and the AC magnetic flux is induced to the specific portion of the top plate 12, that is, to the specific portion superjacent to the primary coil 11. The primary coil 11 incorporated in the battery charging cradle 10 does not have to be made thin like the secondary coil 21. For such a reason, the primary coil 11 has a wire material wound on a core 13 which is made of a magnetic material. The core 13 is of a magnetic material such as ferrite having a higher magnetic permeability, and is shaped like a pot with its top portion being open. The pot-shaped core 13 is in a shape of connecting, at its bottom, a columnar portion 13A located in the center of the spirally wound primary coil 11, to a cylindrical portion 13B located on the outer periphery. The primary coil 11 having the core 13 converges the magnetic flux to the specific portion of the top plate 12, so that the electric power can be efficiently transmitted to the secondary coil 21. The primary coil, however, does not necessarily have to have a core, and thus may be a coreless coil.

The battery charging cradle 10 is provided, on its top plate 12, with a positioning protrusion 14 which projects upwardly. The positioning protrusion 14 is provided to facilitate placement of the mobile electronic device 20 to a specific position of the top plate 12. That is to say, the positioning protrusion 14 is guided to a positioning recess 24 of the mobile electronic device 20, so that the mobile electronic device 20 may be placed to a predetermined position of the top plate 12. The positioning protrusion 14 is provided in the center of the primary coil 11. The battery charging cradle 10 is provided with the positioning protrusion 14 in the center of the specific portion to which the primary coil 11 induces the AC magnetic flux. This is because the specific portion of the top plate 12 to which the AC magnetic flux is induced by the primary coil 11 is superjacent to the primary coil 11. The positioning protrusion 14 is columnar. The position protrusion 14 is guided to the positioning recess 24 of the mobile electronic device 20, and the mobile electronic device 20 is made rotatable about the positioning protrusion 14. In this structure, while the mobile electronic device 20 is placed to the specific portion of the top plate 12, the mobile electronic device 20 is freely rotatable in a horizontal plane. Even when the mobile electronic device 20 is rotated about the positioning protrusion 14, the primary coil 11 remains electromagnetically coupled to the secondary coil 21. This is because the secondary coil 21 of the mobile electronic device 20 is disposed to the specific portion. The battery charging cradle 10 with this structure allows the mobile electronic device 20 to be placed in a free posture to the top plate 12 of the battery charging cradle 10, so that the rechargeable battery 31 can be charged positively. The structure where the mobile electronic device 20 is placed to the specific portion and for a free rotation can also be realized when the positioning recess is columnar. That is to say, it is practicable to make columnar either or both of the positioning protrusion 14 and the positioning recess 24.

The AC power source 15 connected to the primary coil 11 supplies high-frequency electric power, such as 20 kHz to 1 MHz, to the primary coil 11.

Figure 7:
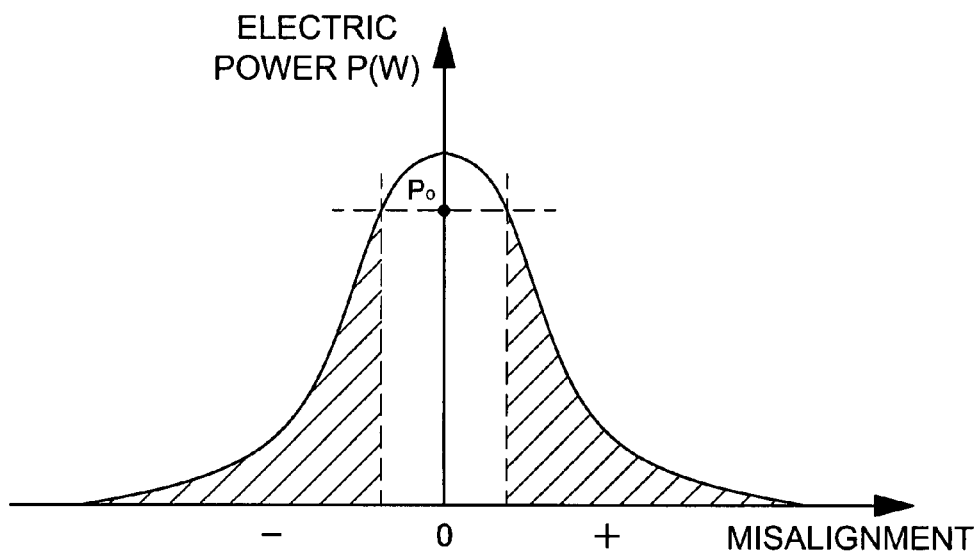
FIG. 7 is a graph showing how the position sensor detects the misalignment of the primary coil.

The AC power source 15 incorporates a position sensor 16 for detecting the position for placement of the mobile electronic device 20. The position sensor 16 detects the position where the mobile electronic device 20 is placed on the top plate 12. When the position of placing the mobile electronic device 20 is out of alignment with a normal position for placement, a misalignment alarm is delivered. The position sensor 16 detects any one(s) of an electric current flowing through the primary coil 11, power consumption in the primary coil 11, a resonance frequency in the primary coil 11, and an impedance in the primary coil 11, so that the position of the mobile electronic device 20 is detected. This is because when the mobile electronic device 20 is out of alignment with the normal position for placement, there occurs a variation in the electric current flowing through the primary coil 11, the power consumption in the primary coil 11, the resonance frequency in the primary coil 11, and the impedance in the primary coil 11. FIG. 7 shows the characteristics that power consumption in the primary coil 11 varies in accordance with the position of the mobile electronic device 20. As depicted in this Figure, when the primary coil 11 is electromagnetically coupled to the secondary coil 21 in an ideal state, the power consumption in the primary coil 11 becomes maximal, so that the electric power can be efficiently carried from the primary coil 11 to the secondary coil 21. However, when the mobile electronic device 20 is out of alignment with the normal position for placement, the electromagnetic coupling is reduced between the primary coil 11 and the secondary coil 21, so that an equivalent impedance in the primary coil 11 varies and the power consumption is reduced. Therefore, in the position sensor 16, when the power consumption in the primary coil 11 becomes lower than a predetermined value (P0), a misalignment alarm is delivered to urge that the mobile electronic device 20 should be placed in a proper position. The battery charging cradle 10 having both of the positioning protrusion 14 and the position sensor 16 allows the mobile electronic device 20 to be more positively placed to the specific portion of the battery charging cradle 10. However, the battery charging cradle can also be of a structure that either one of the positioning protrusion or the position sensor is provided to enable the mobile electronic device to be placed to a specific portion of the battery charging cradle.

Since the impedance in the primary coil 11 varies in accordance with a position of the mobile electronic device 20, the value of electric current and the resonance frequency vary as well. Therefore, the position sensor 16 is also able to detect the position of the mobile electronic device 20, based on the electric current in the primary coil 11 and the resonance frequency. The position sensor 16 that judges a position of the mobile electronic device 20, based on the resonance frequency in the primary coil 11, detects the resonance frequency by varying the frequency of the high frequency wave supplied to the primary coil 11 and judging the variation in the electric current with respect to the varied frequency. This becomes possible because the electric current in the primary coil 11 indicates the peak value in terms of the resonance frequency. The position sensor 16 stores the resonance frequency band being in a state that the mobile electronic device 20 is arranged in a normal position for placement, so that when the resonance frequency deviates from such resonance frequency band, a misalignment alarm is delivered, based on judgment that the mobile electronic device 20 is not arranged in a normal position for placement.

The position sensor 16 is so designed as to light an LED 17, vary a color delivered from the lit LED 17, or vary a blinking state of such light for delivering the misalignment alarm, or else such misalignment is warned by means of a sound to be generated by a loud speaker 18. For example, the LED 17 is able to vary a color of light emission or a blinking state, based on the extent of the misalignment, while the loud speaker 18 is also able to vary a volume or kind of a sound, based on the extent of the misalignment.

When the position for placement of the mobile electronic device 20 is detected to be on an exact position for placement, the position sensor 16 can also make a normality indication. Such normality indication is made by lighting the LED 17, varying the color of the lit LED 17, or varying the light in its blinking state, or by the sound generated by the loud speaker 18.

Further, the position sensor is also able to judge a position for placement, based on a signal given by the mobile electronic device. The mobile electronic device detects whether the electric power induced to the secondary coil is higher than a predetermined value, judges whether the device is in a proper position for placement on the battery charging cradle, and then transmits a position signal to the position sensor via the secondary coil and the primary coil. The mobile electronic device modulates a carrier wave by means of the position signal and transmits the carrier wave from the secondary coil to the primary coil, while the position sensor demodulates the carrier wave induced to the primary coil to detect the position signal.

Figure 8:
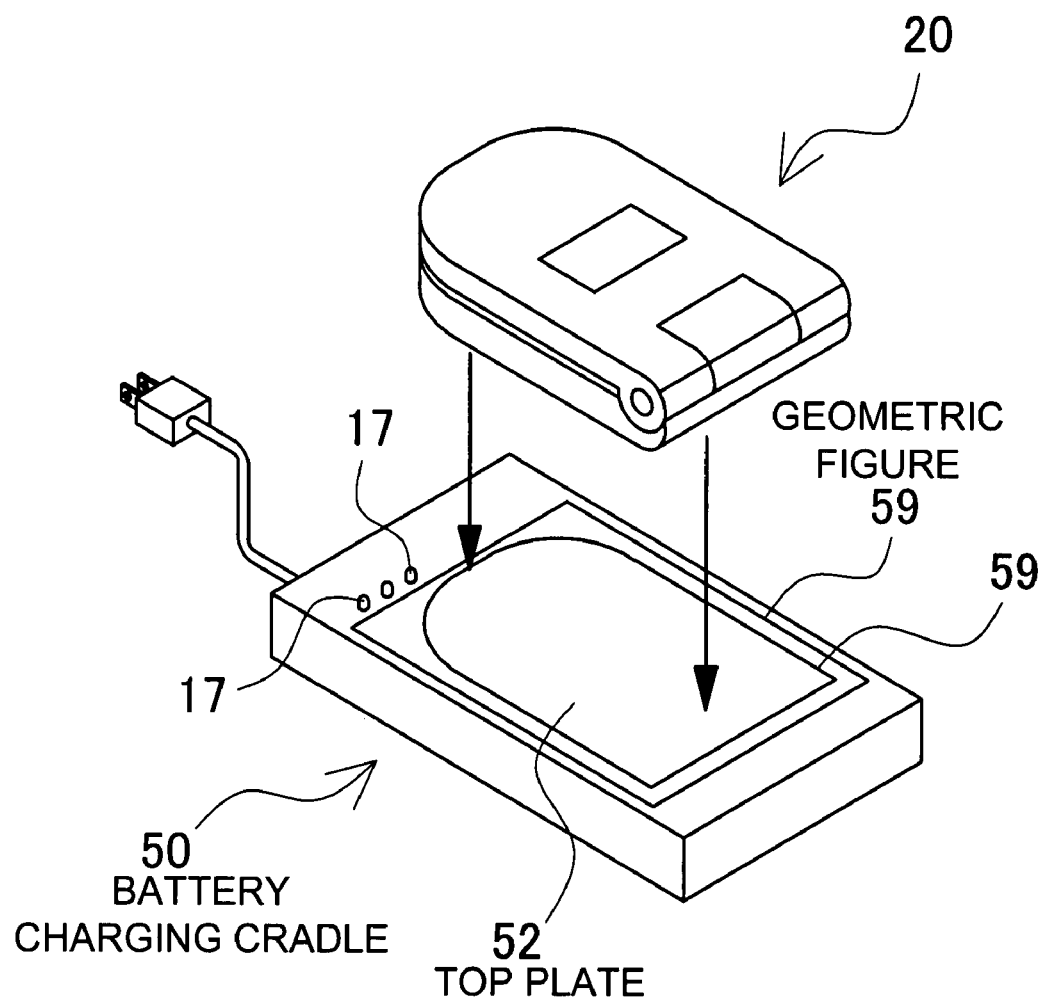
FIG. 8 is a perspective view showing the battery charging cradle and the mobile electronic device in accordance with an alternative embodiment of the present invention.

In regard to the battery charging cradle 10, it is possible to arrange the mobile electronic device 20 in a normal position for placement, without the use of the positioning protrusion 14 and the positioning recess 24 in combination or without the position sensor 14; or alternatively, as shown in FIG. 8, placement of the mobile electronic in a normal position is also made possible by indicating, on a top plate 52 in addition to the foregoing components, a geometric figure 59 that represents a position for placement of the mobile electronic device 20. An illustrated battery charging cradle 50 has the geometric figure printed on to indicate a contour of the mobile electronic device 20, for the position for placement to be indicated. In regard to the position for placement, the battery charging cradle 50 having the contour of the mobile electronic device 20 printed for indication allows the mobile electronic device 20 to be placed in alignment with the contour (the geometric figure 59) of the position for placement, so that the mobile electronic device 20 can be arranged in a normal position for placement. Further, the illustrated battery charging cradle 50 has geometric figures 59, indicative of a position for placement for plural kinds of mobile electronic devices, printed on the top plate 52. The plurality of geometric figures 59 are indicated, for example, to correspond with the contours of the plural kinds of mobile electronic devices. The battery charging cradle 50 thus designed carries the feature that different kinds of mobile electronic devices can be arranged in an accurate position for placement.

Further, the geometric figure to be printed on the top plate of the battery charging cradle does not necessarily have to reproduce an exact contour of the mobile electronic device to be placed on, and so the geometric figure can also be of many other patterns for the mobile electronic device to be arranged in an accurate position for placement. As a geometric figure 79 marked on the upper surface of a top plate 72, battery charging cradles 70 as shown in FIG. 9 through FIG. 15 respectively indicate a circle, a rectangle, or a portion of such pattern, as well as a pattern combining a straight line, a dot, a triangle, etc. Further the battery charging cradles 70 shown in these Figures are extendedly provided with a positioning protrusion 74 in the center of the top plate 72. Therefore, in these battery charging cradles 70, the mobile electronic device is arranged in a position for placement on the top plate 72 by means of both a positioning protrusion 74 and the geometric figure 79 indicated on the top plate 72. In these battery charging cradles, however, the mobile electronic device can also be arranged in the position for placement, based only on the geometric figure to be marked on the top plate to indicate the position for placement of the mobile electronic device, without having the positioning protrusion provided on the top plate.

Figure 9:
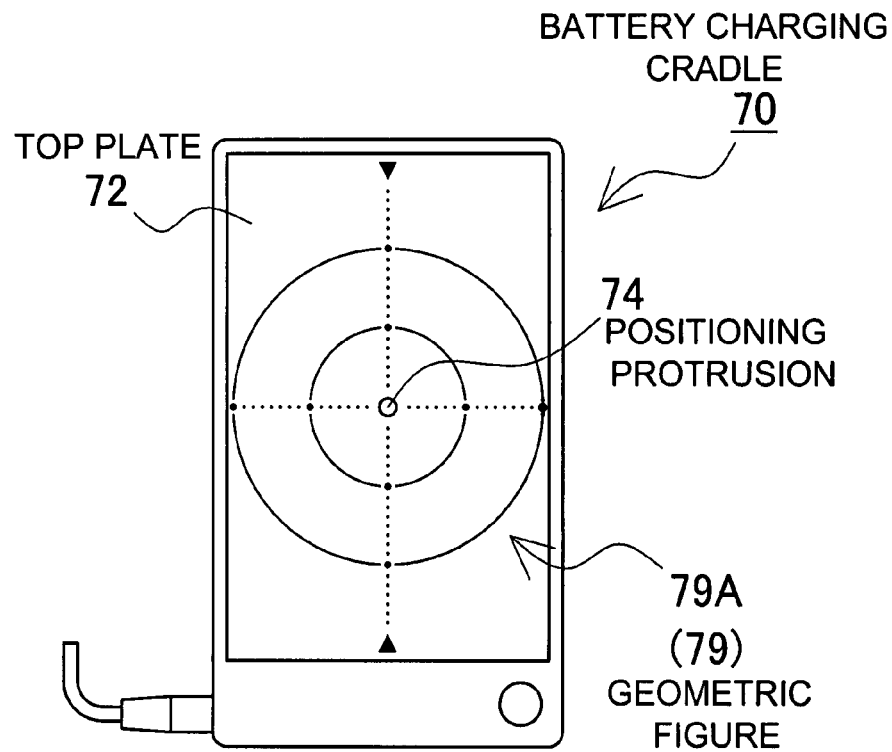
FIG. 9 is a top plan view showing an example of the geometric figure indicated on the top plate of the battery charging cradle.
Figure 10:
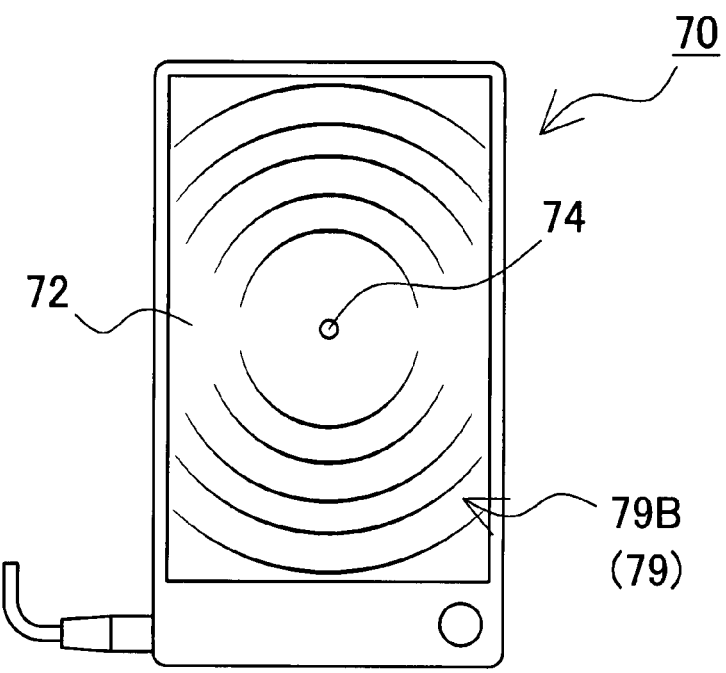
FIG. 10 is a top plan view showing another example of the geometric figure indicated on the top plate of the battery charging cradle.
Figure 11:
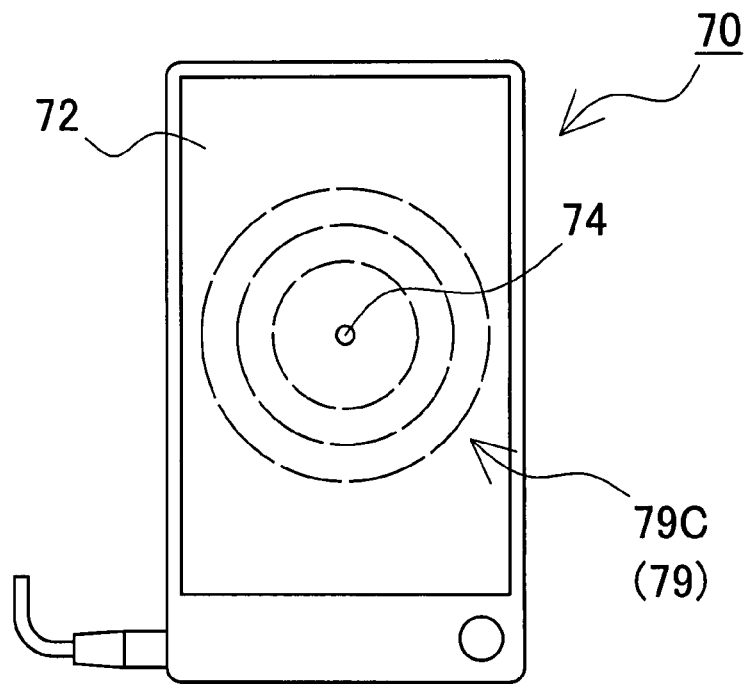
FIG. 11 is a top plan view showing even another example of the geometric figure indicated on the top plate of the battery charging cradle.

The battery charging cradles 70 shown in FIG. 9 through FIG. 11 respectively indicate a plurality of concentric circles with the positioning protrusion 74 being centered on the upper surface of the top plate 72. A geometric figure 79A in FIG. 9 indicates two concentric circles as well as dotted vertical and horizontal axes that intersect, with the positioning protrusion 74 being centered. A geometric figure 79B shown in FIG. 10 is of a pattern where five concentric arcs are arranged vertically (up and down when viewed in FIG. 10) in an equidistant manner on the top plate 72. Furthermore, a geometric figure 79C shown in FIG. 11 indicates three partially cut-out concentric circles which are indicated by chain lines.

Figure 12:
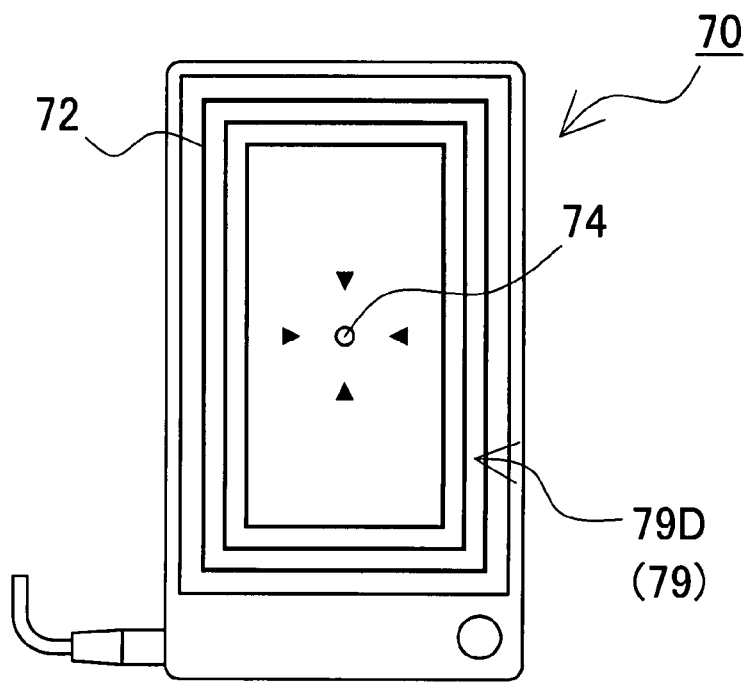
FIG. 12 is a top plan view showing a further example of the geometric figure indicated on the top plate of the battery charging cradle.
Figure 13:
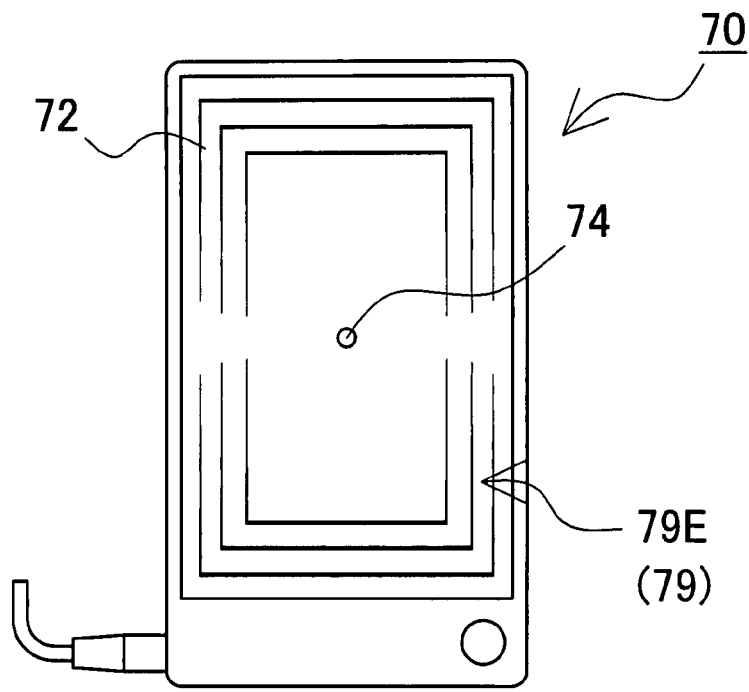
FIG. 13 is a top plan view showing a still further example of the geometric figure indicated on the top plate of the battery charging cradle.

The battery charging cradles 70 shown in FIG. 12 and FIG. 13 respectively indicate a plurality of rectangles that are formed along the peripheral lines of the top plate 72, circumferentially surrounding the upper surface of the top plate 72. The plurality of rectangles are equidistantly indicated as the rectangles with different sizes, with the positioning protrusion 74 being located at the intersection point of diagonal lines. A geometric figure 79D shown in FIG. 12 indicates three rectangles at the periphery of the top plate 72 as well as indicating triangular marks in four directions surrounding the central positioning protrusion 74 to guide the position of the positioning protrusion 74. Further, a geometric figure 79E shown in FIG. 13 indicates three rectangles at the periphery of the top plate 72 as well as dividing each rectangle into two parts vertically in the middle as viewed in the FIG. 13, so that such divided parts are disposed in the upper and lower portions on the top plate 72.

Figure 14:
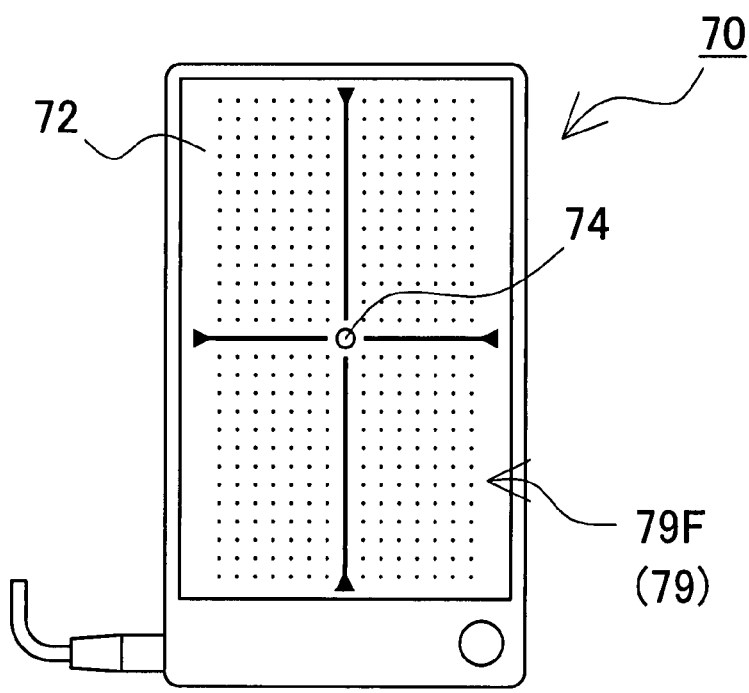
FIG. 14 is a top plan view showing an even further example of the geometric figure indicated on the top plate of the battery charging cradle.

Further, a geometric figure 79F of the battery charging cradle 70 in FIG. 14 indicates the axes intersecting at the vertical and horizontal center of the top plate 72 as well as indicating innumerable dots over the generally whole area of the top plate 72. The innumerable dots are indicated in an equidistant location in the intersection point, with the horizontal and vertical axes serving as x and y axes. Furthermore, a geometric figure 79G of the battery charging cradle 70 in FIG. 15 equidistantly indicates a plurality of axes running vertically and horizontally toward the center portion, as well as equidistantly indicating a plurality of concentric circles with the positioning protrusion 74 being centered, and thus these axes and concentric arcs are interconnected.

Figure 15:
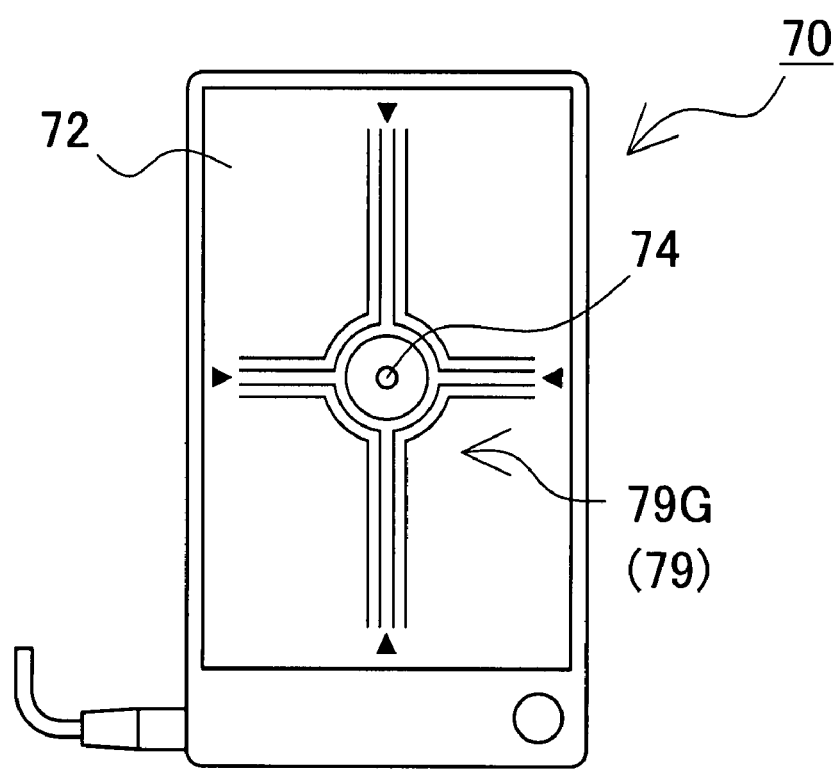
FIG. 15 is a top plan view showing a further example of the geometric figure indicated on the top plate of the battery charging cradle.

As shown in FIG. 9 through FIG. 11, in the geometric figure 79 indicative of a plurality of concentric circles, the center of each concentric circle can be recognized as a position of the positioning protrusion 74; and further as shown in FIG. 9, FIG. 14 and FIG. 15, in the geometric figure 79 indicative of the intersectional axes running through the vertical and horizontal centers of the top plate 72, the intersection point of axes can be recognized as the positioning protrusion 74. Further, as shown in FIG. 12 and FIG. 13, in the geometric figure 79 indicative of a plurality of rectangles along the circumferential lines of the top plates 72, the outer periphery of the mobile electronic device can be arranged and positioned along the rectangle; and in the geometric figure 79 equidistantly indicative of the innumerable dots generally all over the top plate 72, the position and direction of the mobile electronic device can be recognized by means of the number of the dots or the symmetry of the dots as seen outside the mobile electronic device. It should be noted, however, that the geometric figure indicated on the top plate is not limited to the above-mentioned patterns but can be any other pattern that allows the mobile electronic device to be arranged at an accurate position for placement.

As described above, the battery charging cradle 70 indicating the geometric figure 79 indicative of the position for placement of the mobile electronic device carries the advantage that when the mobile electronic device is placed on the cradle, the placement can be made with user's inference of the position of the positioning protrusion 74 provided on the top plate 72. When the mobile electronic device is placed on the battery charging cradle, the positioning protrusion is hidden behind the mobile electronic device to be placed, disabling an accurate position to be visually recognized. For this reason, it is likely to become difficult to quickly fit the positioning recess of the mobile electronic device to the positioning protrusion of the top plate. However, in the case of the battery charging cradle 70 having the above-illustrated geometric figure 79, the position of the positioning protrusion 74 can be inferred from the marked pattern, so that the feature of the present invention can be actualized in that the positioning recess of the mobile electronic device can be fitted to the positioning protrusion 74 on the top plate 72 for a quick setup.

Figure 16:
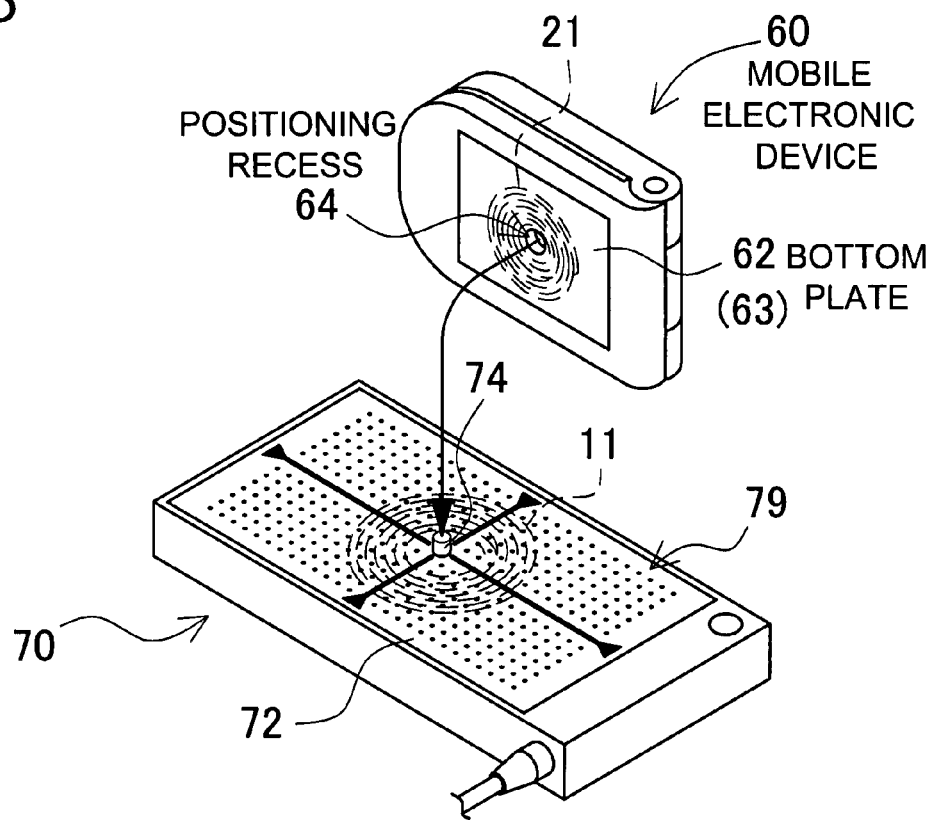
FIG. 16 is a perspective view showing how the mobile electric device is set up with the battery charging cradle illustrated in FIG. 14.

Further, a mobile electronic device 60 shown in FIG. 16 has a positioning recess in the center of the back, surface. The mobile electronic device 60 has the secondary coil 21 inside a back cover 63 which is a bottom plate 62 so that a positioning recess 64 is placed in the center of the back surface, namely, so that the incorporated secondary coil 21 is positioned in the center portion of the back surface. The illustrated battery charging cradle 70 is also provided with the positioning protrusion 74 in the center of the top plate 72. Thus, in the structure where the positioning protrusion 74 is provided in the center of the top plate 72 of the battery charging cradle 70 and also the positioning recess 64 is provided in the center of the bottom plate 62 of the mobile electronic device 60, when the mobile electronic device 60 is arranged in the position for placement on the battery charging cradle 70, the center of the mobile electronic device 60 can be arranged to be positioned in the center of the top plate 72 of the battery charging cradle 70, regardless of the vertical and horizontal directions and the rotational direction of the mobile electronic device 60, so that the primary coil 11 can be electromagnetically coupled to the secondary coil 21 in an ideal state.

Figure 17:
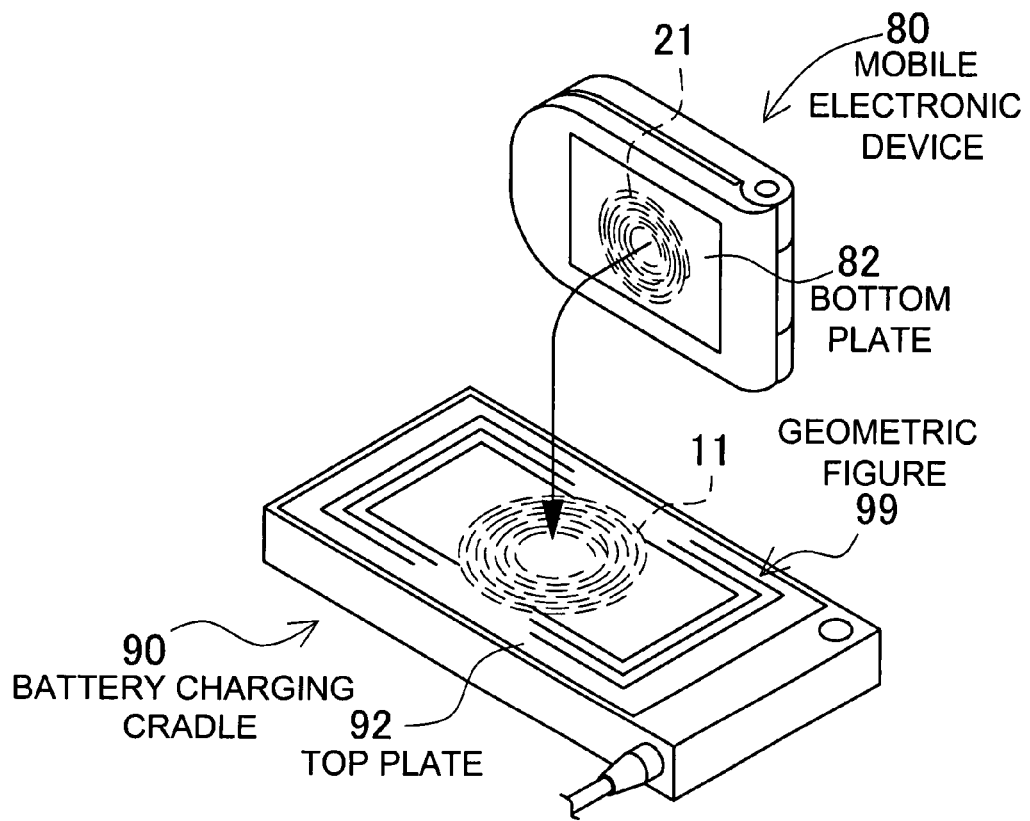
FIG. 17 is a perspective view showing the battery charging cradle and mobile electronic device in accordance with an alternative embodiment of the present invention.

In addition, as shown in FIG. 17, the battery charging cradle 90 can also indicate only a geometric figure 99 indicative of the position for placement of a mobile electronic device 80, without having the positioning protrusion provided to the top plate 92. The battery charging cradle 90 also allows the mobile electronic device 80 to be arranged in the position for placement while inferring the position of the primary coil 11 incorporated in the top plate 92, which is possible when the geometric figure 99 indicated on the top plate 92 is the pattern previously indicated in FIG. 9 through FIG. 15. Further, a battery charging cradle 90 and the mobile electronic device 80 in FIG. 17 as well has the primary coil 11 and the secondary coil 21 in the center. That is, the battery charging cradle 90 incorporates the primary coil 11 inside the center portion of a top plate 92, while the mobile electronic device 80 incorporates the secondary coil 21 in the center portion of the back surface. In the case of the battery charging cradle 90 and the mobile electronic device 80 of this structure as well, the center of the mobile electronic device 80 can be arranged to be positioned in the center of the top plate 72 of the battery charging cradle 90, regardless of the vertical and horizontal directions and the rotational direction of the mobile electronic device 80, so that the primary coil 11 can be electromagnetically coupled to the secondary coil 21 in an ideal state.

It should be noted that the geometric figure indicative of the position for placement does not necessarily have to be printed but that a geometric figure can also be indicated by means of a line or an aggregated point light source such as an LED indicative of the position for placement of the mobile electronic device. The geometric figure of the position for placement is indicated in a position where the mobile electronic device is placed, such that the primary coil can be electromagnetically coupled to the secondary coil efficiently, and the rechargeable battery can be charged.

The mobile electronic device 20 incorporates the secondary coil 21, which is electromagnetically coupled to the primary coil 11 of the battery charging cradle 10, and the rechargeable battery 31, which is charged by the electric power induced to the secondary coil 21. The mobile electronic device 20 in FIG. 3 and FIG. 4 incorporates the secondary coil 21 and rechargeable battery 31 within a battery pack 30. The mobile electronic device 20, using a back cover 23 as a bottom plate 22, is provided with the positioning recess 24 to the bottom plate 22 being the back cover 23. The bottom plate 22 being the back cover 23 is provided with the positioning recess 24, and is also provided with an inwardly protruding portion 25 on the interior face. The inwardly protruding portion 25 is disposed in a hollow portion 26 of the battery pack 30. Therefore, the battery pack 30 is provided with the hollow portion 26 that guides the inwardly protruding portion 25 provided to the bottom plate 22 being the back cover 23. However, the inventive mobile electronic device is not limited to a structure where the secondary coil and the rechargeable battery are incorporated within the battery pack. The mobile electronic device can also be structured to undetachably incorporate the secondary coil and the rechargeable battery in a case, or alternatively can also be structured to detachably incorporate the rechargeable battery alone in the case and to undetachably incorporate the secondary coil in the case. In the mobile electronic device which incorporates the secondary coil in the case and incorporates the rechargeable battery detachably in the battery pack, the secondary coil and the battery pack are connected at a contact point (not shown), so that the rechargeable battery is charged by the electric power induced to the secondary coil.

Figure 4:
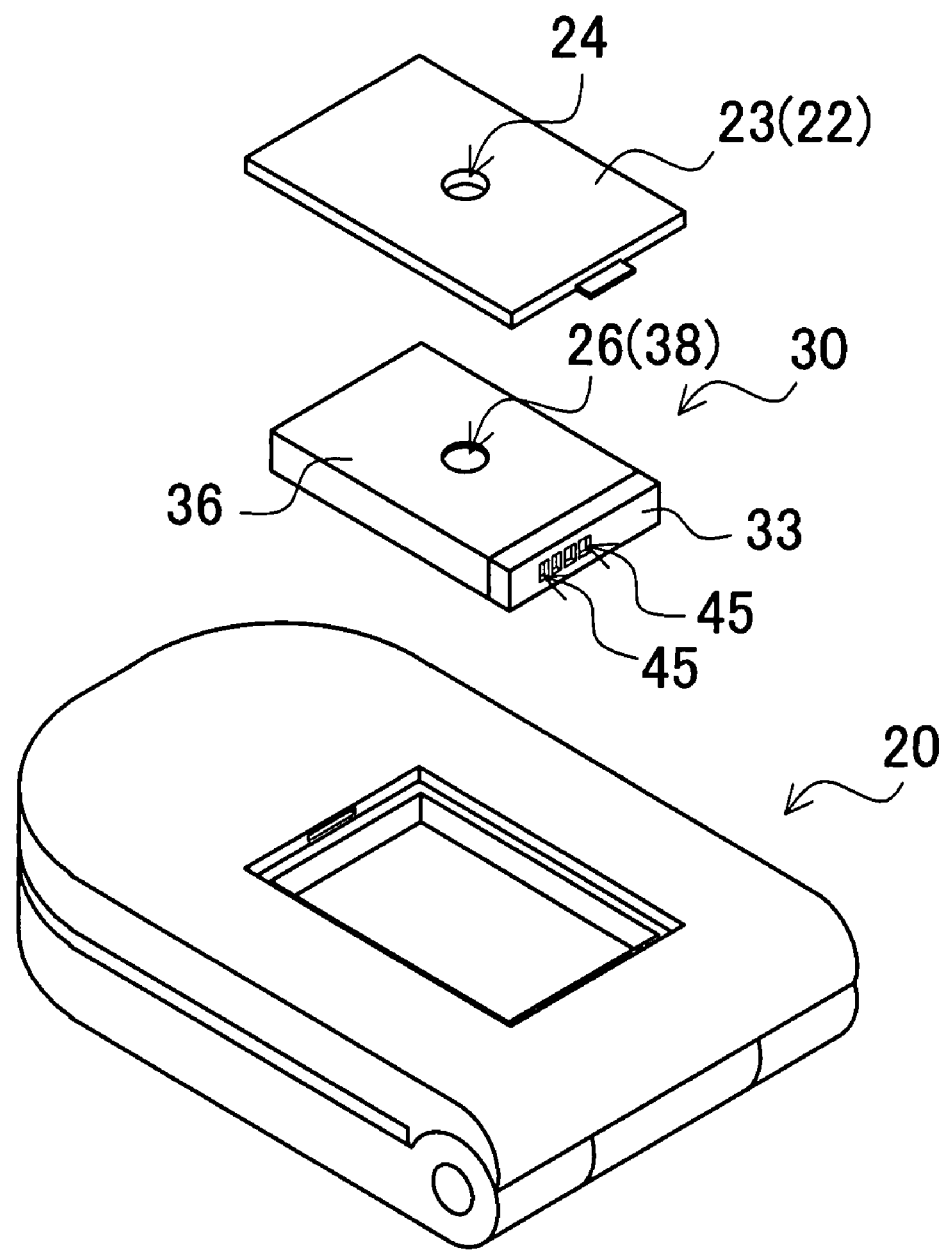
FIG. 4 is an exploded perspective view how the battery pack is taken out of the mobile electronic device illustrated in FIG. 1.
Figure 5:
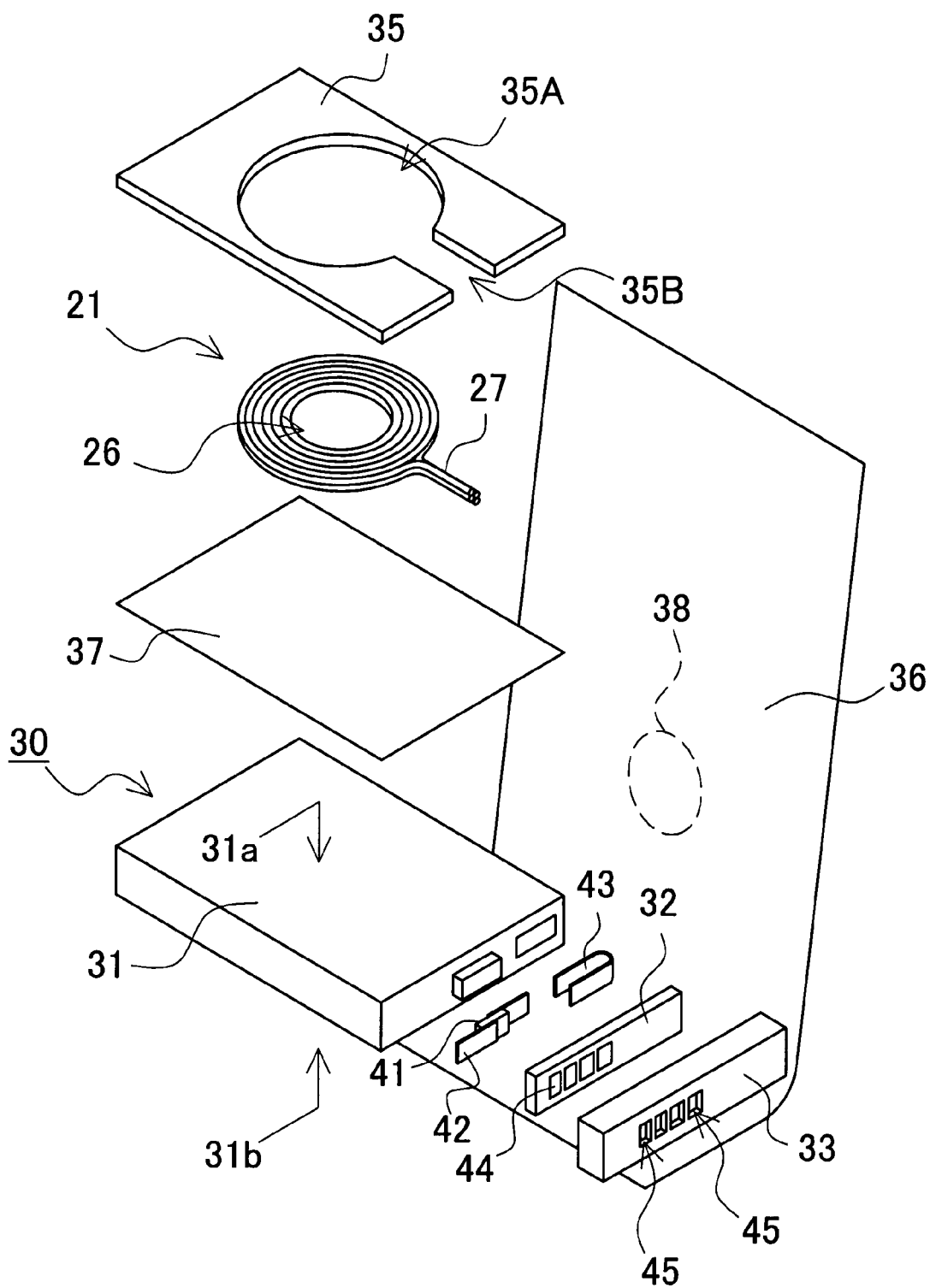
FIG. 5 is an exploded perspective view of the battery pack shown in FIG. 4.
Figure 6:
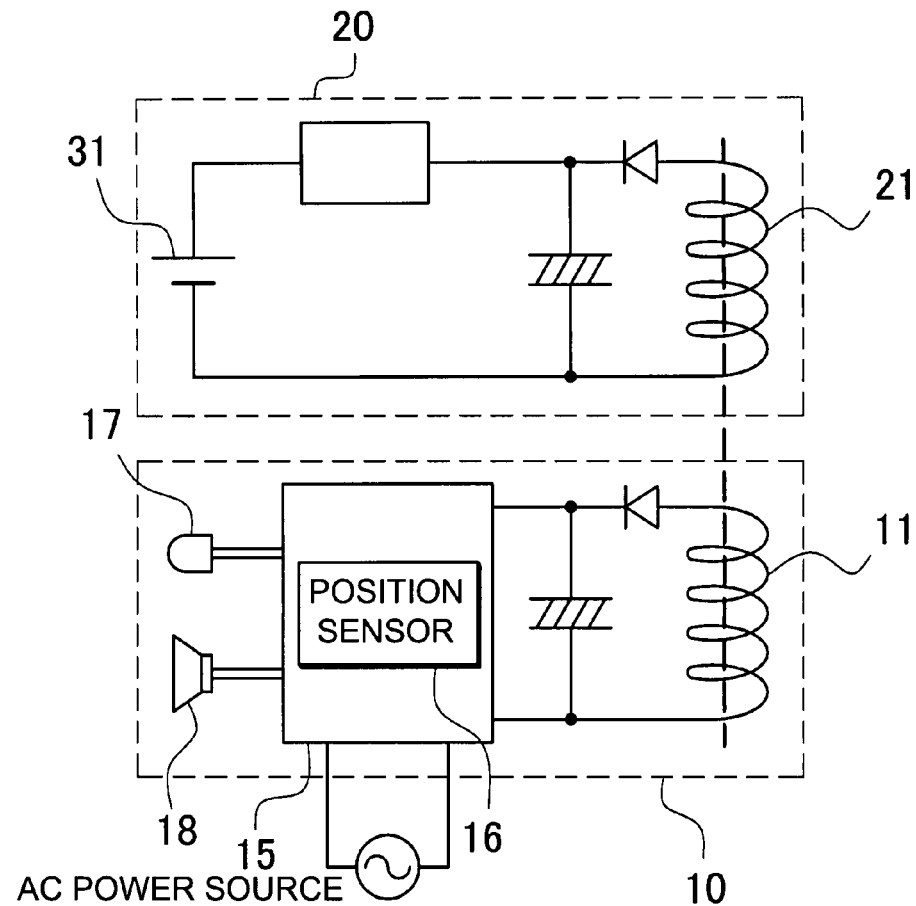
FIG. 6 is a block diagram of the battery charging cradle and the mobile electronic device in accordance with an embodiment of the present invention.

The battery pack 30 in FIG. 4 and FIG. 5 includes a thin-type secondary battery 31, a circuit board 32, and a cover casing 33 for covering and disposing the circuit board 32 in place. Further, the illustrated battery pack has the secondary coil 21 and a spacer 35 disposed on the surface of the thin-type secondary battery 31, as well as having the entirety wrapped with a plastic film 36 to hold the components in place.

The battery 31 is a lithium-ion battery or a polymer battery. The polymer battery is a lithium polymer battery. The battery, however, may be any rechargeable kinds of batteries including a nickel-hydrogen battery and a nickel-cadmium battery. Further, the battery is a thin-type battery with its width being larger than its thickness, with the opposing surfaces constituting a first flat surface 31a and a second flat surface 31b. The first flat surface 31a and the second flat surface 31b are rectangular.

The circuit board 32 has a protection circuit (not shown) implemented for protecting the rechargeable battery 31. The protection circuit serves as a circuit for protecting the rechargeable battery 31 against an excess current, or as a circuit for preventing the rechargeable battery 31 from overcharge or over-discharge. The battery pack in FIG. 5 is so arranged that the circuit board 32 is interconnected to the positive and negative electrodes of the rechargeable battery 31 via a lead plate 42, 43. The illustrated battery pack is so arranged that a connection lead at one side serves as a protection element 41 and is connected via the lead plate 42 to a protruded electrode which is provided to the electrode terminal face of the rechargeable battery 31, and that a connection lead at the other side serves as the lead plate 43 and is connected to a planar electrode which is provided to the electrode terminal face of the rechargeable battery 31. The illustrated battery pack has the connection lead at one side to serve as the protection element 41, but both of the connection leads can also serve as the lead plates. However, it is also possible that the protection element such as a PTC and a thermal fuse is implemented in the circuit board, to connect the circuit board to the battery by using the lead plate, etc. In the battery pack, the protection element can be a thermal fuse instead of the PTC, and the thermal fuse is used as the connection lead at one side, so that the circuit board can be connected to the battery.

When the circuit board 32 is connected to the rechargeable battery 31 via the lead plates 42, 43, the cover casing 33 is connected and disposed in place. However, the battery pack, although not shown, can also have a board holder disposed between the thin-type battery and the circuit board to hold the circuit board in place via the board holder. The circuit board 32 has an output terminal 44 fixed to the surface. The output terminal 44 is exposed to the outside through an electrode window 45 which is provided to the cover casing 33. The cover casing 33 is formed of an insulation material such as a plastic material, and is connected to the battery end face for the circuit board 32 to be disposed.

Figure 3:
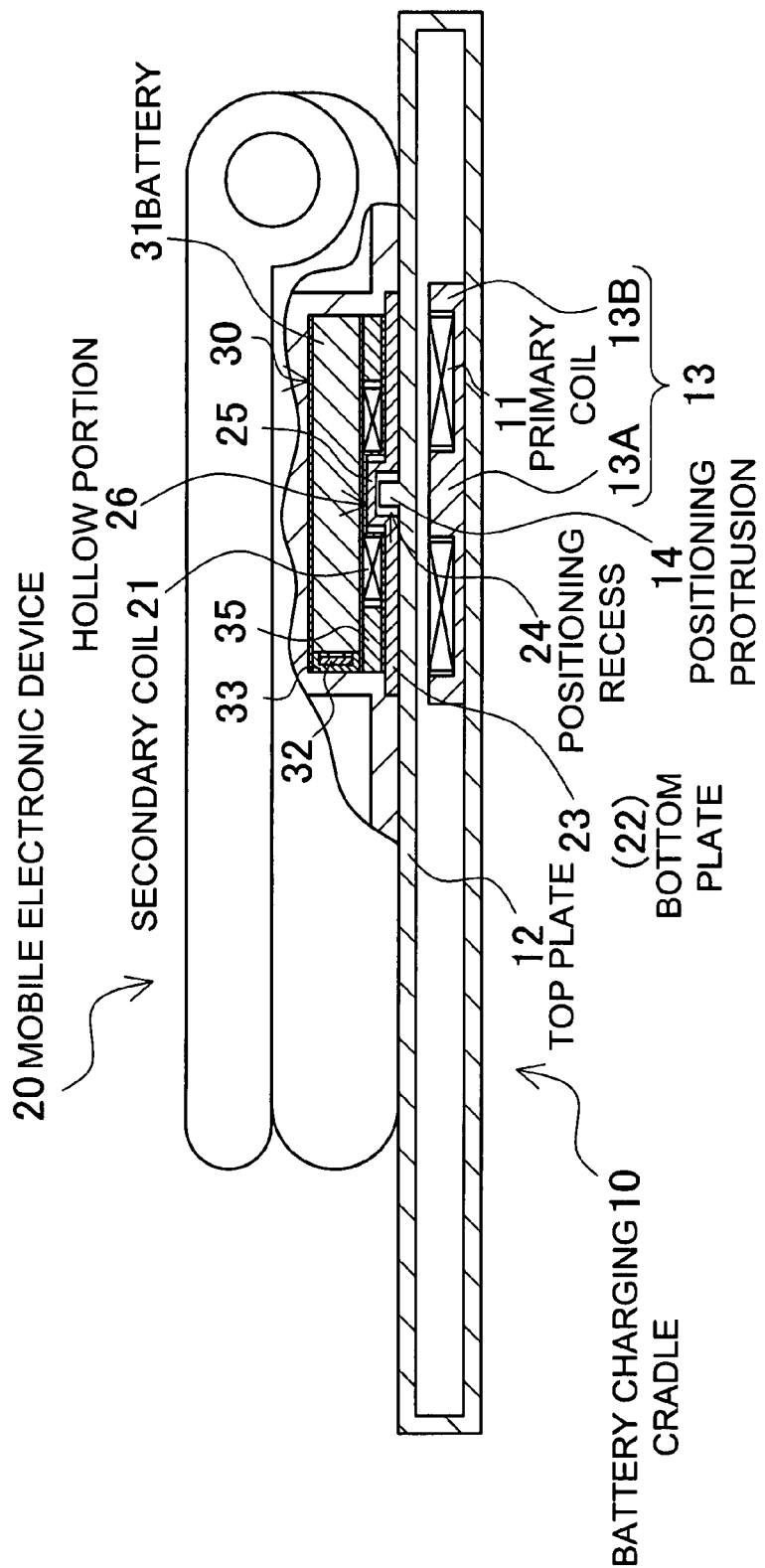
FIG. 3 is a cross-sectional view showing how the battery charging cradle and the mobile electronic device are interconnected as illustrated in FIG. 2.

The secondary coil 21 is a planar coil with a wire material being spirally wound on a planar surface. Further, the planar coil being the secondary coil 21 is a coreless coil. The secondary coil 21 being the planar coil is fixedly layered via an electromagnetic shield coating 37 on the first flat surface 31a of the thin-type battery. When the battery pack 30 is set in the mobile electronic device 20, the secondary coil 21 is disposed inside the bottom plate 22 and in an adjacent and parallel relationship with the bottom plate 22. The planar coil being the secondary coil 21 has its central coil diameter to be larger than the inner diameter of the positioning recess 24, or more precisely, to be larger than the outer contour of the inwardly protruding portion 25, so that a hollow portion 26 is provided in the center of the planar coil, and the positioning recess 24 is disposed in the hollow portion 26. The battery pack 30 in FIG. 3 is so constructed and arranged that the inwardly protruding portion 25 provided on the interior surface of the back cover 23 being the bottom plate 22 is inserted into the hollow portion 26 of the secondary coil 21, and that the positioning recess 24 provided to the exterior surface opposite to the inwardly protruding portion 25 is disposed in the hollow portion 26 of the secondary coil 21.

Figure 18:
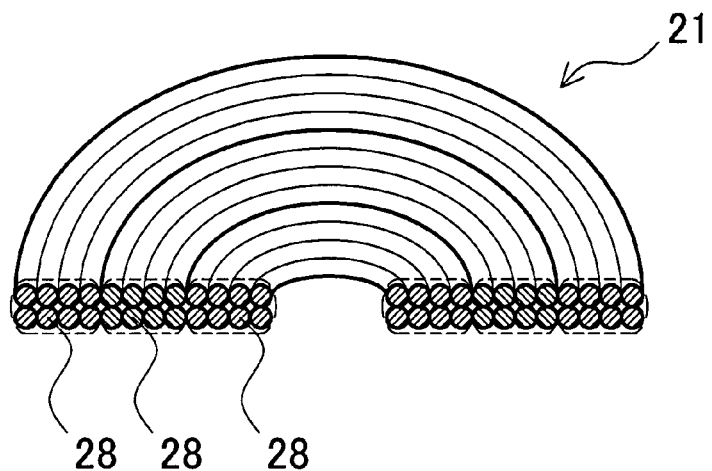
FIG. 18 is an enlarged, cross-sectional, perspective view showing an example of the secondary coil.
Figure 19:
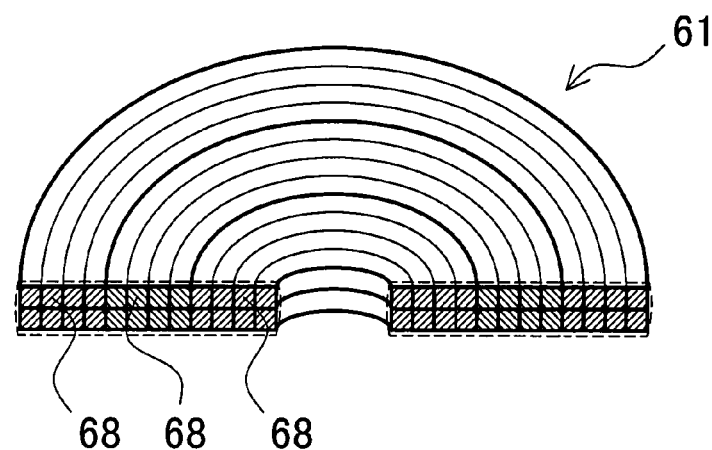
FIG. 19 is an enlarged, cross-sectional, perspective view showing another example of the secondary coil.

FIG. 18 and FIG. 19 are respectively a cross-sectional perspective view of the wire material used in the secondary coil 21, 61. The wire materials of the secondary coils 21, 61 illustrated in these Figures are a plurality of insulated metallic wires 28, 68 connected in parallel. In these Figures, the plurality of insulated metallic wires 28, 68 to be connected mutually in parallel are indicated in the same directional hatching, and are also enclosed by a chain line. The chain line is merely intended to clarify a section of each wire material, and the line does exist in the actual secondary coil 21, 61. The insulated metallic wire 28, 68 is a methylal (or formal) wire or an enameled wire, the surface of which is insulated by an insulating coating. The plurality of insulated metallic wires 28, 68 are laid in parallel on the first flat surface 31a of the thin-type battery, and are in the form of the coreless planar coil being spirally wound.

In the secondary coil 21, 61 in FIG. 18 and FIG. 19 respectively, four pieces of insulated metallic wires 28, 68 are laid in parallel on the first flat surface, and are in the form of the planar coil in two layers which are spirally and concentrically wound. The four pieces of insulated metallic wires 28, 68 are connected at their both ends for a mutually parallel connection. The thickness of the secondary coil 21, 61, with the planar coils being stacked in two layers, becomes equivalent to a size of two pieces of insulated metallic wire 28, 68, and the current capacity becomes equivalent to a multiplicity of the number of insulated metallic wires 28, 68 connected in parallel, that is, four times in this particular instance. Therefore, in the case of the secondary coil 21, 61 in FIG. 18 and FIG. 19, when the number of insulated metallic wires 28, 68 connected in parallel is increased, with the thickness remaining the same, the current capacity can be increased to a corresponding multiplicity. The secondary coil 21 in FIG. 18 is circular in the cross section of the insulated metallic wire 28. The secondary coil 61 in FIG. 19 is rectangular in the cross section of the insulated metallic wire 68. In regard to the secondary coil 61, since the adjoining gap existing between the insulated metallic wires 68 can be reduced to minimum, it is possible to increase the current capacity when the size of the cross section area is enlarged in a single piece of insulated metallic wire 68.

Figure 20:
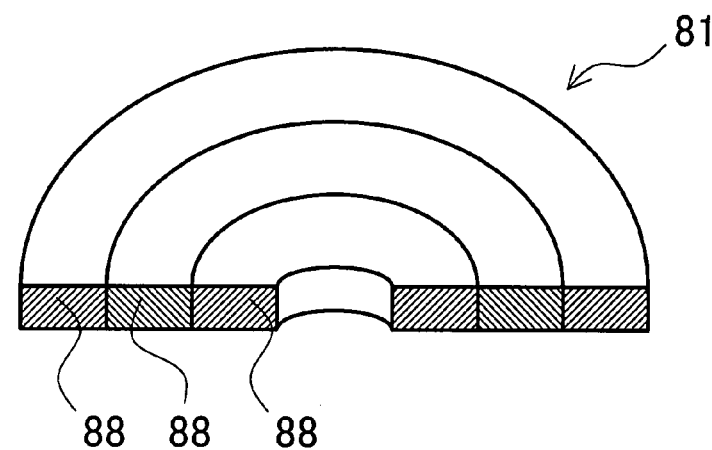
FIG. 20 is an enlarged, cross-sectional, perspective view showing even another example of the secondary coil.

Further, in the wire material in a secondary coil 81 shown in a cross-sectional view in FIG. 20, an insulated metallic wire 88 with its surface being insulated by an insulating coating is not formed to be circular in its cross-section. The insulated metallic wire 88 has a larger width being parallel to the first flat surface of the thin-type battery than the thickness being orthogonal to the flat surface. The illustrated insulated metallic wire 88 is formed to be rectangular in its cross-section, and is in the form of the planar coil being spirally wound, in a posture where the elongated side is parallel to the first flat surface. The secondary coil 81 thus structured is in a larger width of the insulated metallic wire 88, so that the current capacity is increased with respect to the thickness of the planar coil. For example, in the case of the insulated metallic wire 88 with its width being four times its thickness, the current capacity can be increased by four times or more when the thickness remains the same as the thickness in the planar coil of insulated metallic wire with its cross-sectional form being circular. Therefore, the secondary coil 21 thus structured is able to increase the current capacity when the width is made larger, with the thickness remaining unchanged.

The battery pack 30 provided with a secondary coil 21 having a large current capacity is able to quickly charge the secondary battery 31 in a large amount of current, by supplying high power to the primary coil 11 to which the electric power is supplied by the magnetic induction effect. In the case of the battery pack 30 which is quickly charged by having high power supplied from the primary coil 11, an eddy current is correspondingly increased which flows to an external can or container by the magnetic induction effect. Thus, this suffers such a disadvantage as the external can or container is heated by the eddy current. In order to avoid such disadvantage, there is an electromagnetic shield coating 37 provided between the secondary coil 21 and the first flat surface 31a of the thin-type battery.

The electromagnetic shield coating 37 serves to magnetically shield a magnetic flux line received from the primary coil 11 so that an ill effect on the secondary battery 31 may be avoided. In order to shut the magnetic flux line from the primary coil 11, the electromagnetic shield coating 37 is fabricated into a sheet form, using a material having a higher magnetic permeability, such as an amorphous metal. The electromagnetic shield coating 37 in a sheet form is layered on the first flat surface 31a of the thin-type battery, and the secondary coil 21 is then layered on the electromagnetic shield coating 37. The electromagnetic shield coating 37 has such a shape as to cover the first flat surface 31a, that is, the shape being of the same rectangle as the first flat surface 31a. The electromagnetic shield coating 37 covers the entire or substantially entire area of the first flat surface 31a.

As described above, the structure, where the secondary coil 21 is disposed via the electromagnetic shield coating 37 to the secondary battery 31, is able to avoid the effect from the magnetic flux line, for example, such an ill effect as the external can or container of the secondary battery 31 is heated by the flown-in eddy current, and further, since the magnetic flux line irradiated from the primary coil 11 does not affect the secondary battery 31, the electrical efficiency of being transmitted from the primary coil 11 to the secondary coil 21 can be advantageously increased.

The spacer 35, in the form of a sheet or a thin plate layered on the first flat surface 31a, is formed into the same rectangular shape as the first flat surface 31a. The spacer 35 in FIG. 5 is provided with a fitting-in hole 35A, extended through the both sides of the spacer surface at its center portion, for fitting the secondary coil 21 to the spacer surface. The fitting-in hole 35A allows the secondary coil 21 in here, namely fits the secondary coil 21 in, to place the secondary coil 21 in a predetermined position. Therefore, the fitting-in hole 35A is made slightly larger than the contour of the secondary coil 21 to facilitate an easy insertion of the secondary coil 21, for example, being 0.2 mm to 1 mm larger than the contour of the secondary coil 21. The spacer 35 in FIG. 5 has part of the fitting-in hole 35A cut out to form a drawing-out portion 35B where an outgoing line 27 of the secondary coil 21 is disposed. The secondary coil 21 being the spirally wound planar coil has the outgoing lines 27 in the center and the circumference. The spacer 35 is provided with the drawing-out portion 35B to allow these outgoing lines 27 to be drawn out of the planar coil. The outgoing line 27 of the secondary coil 21 is drawn out of the drawing-out portion 35B and is connected to the circuit board 32. Further, the thickness of the spacer 35 is made equal to the thickness of the secondary coil 21. In the spacer 35, when the secondary coil 21 is placed in the fitting-in hole 35, the exterior face of the secondary coil 21 can be made flush or coplanar with the peripheral surface of the spacer 35.

The plastic film 36 is an insulation sheet or label made of a flexible plastic material. The plastic film 36 is adhered, via an adhesion material or an adhesive layer, to the rechargeable battery 31 and the cover casing 33. The plastic film 36 is adhered to the first flat surface 31a, the second flat surface 31b and both of the lateral surfaces of the thin-type battery. Further, the plastic film 3 is provided with a recess 38 in the center portion of the face adhered to the first flat surface 31a and at a position opposite to the central hole of the secondary coil 21, and the interior of the recess 38 coincides with a hollow portion 26. It should be noted that the plastic film can also have a through hole at a position opposite to the central hole of the secondary coil, so that the interior of the through hole which is a center portion of the secondary coil can be a hollow portion. The recess and through hole provided to the plastic film can be made either before or after adhesion to the battery.

The above-described battery pack is assembled by covering the circumference surface with the plastic film 36. However, the battery pack can also be provided with a frame casing to cover the circumference of the battery. The frame casing can be made by integrally forming the entirety with a plastic material.

The above-described battery pack is assembled by the following procedures.

(1) The electromagnetic shield coating 37 is fixed to the first flat surface 31a of the thin-type battery. The electromagnetic shield coating 37 is fixed to the first flat surface 31a by means of the adhesive layer provided on the surface.

(2) The spacer 35 is fixed to the surface of the electromagnetic shield coating 37. The spacer 35 is adhered, for example, to the adhesive layer provided on the surface of the electromagnetic shield coating 37. That is to say, the spacer 35 is adhesively fixed to the first flat surface 31a via the electromagnetic shield coating 37.

(3) The secondary coil 21 is placed into the fitting-in hole 35A of the spacer 35 and fixed to the first flat surface 31a of the thin-type battery. The secondary coil 21 is disposed in a predetermined position of the first flat surface 31a via the adhesive layer on the electromagnetic shield coating 37. At this stage, the outgoing wire 27 of the secondary coil 21 is drawn out of the drawing-out portion 35B of the spacer 35.

(4) The circuit board 32 is placed in a predetermined position of the electrode terminal surface of the battery 31. The circuit board 32 is connected to the positive and negative electrodes of the battery 31 via the lead plates 42, 43, as in a spot welding method. Further, at this stage, the outgoing line 27 of the secondary coil 21 is also connected to the circuit board 32.

(5) The cover casing 33 is connected to the outside of the circuit board 32.

(6) The plastic film 36 is adhered to the outside of the battery assembly when assembled as above, to make up a battery pack.

It should be apparent to those with an ordinary skill in the art that while various preferred embodiments of the invention have been shown and described, it is contemplated that the invention is not limited to the particular embodiments disclosed, which are merely illustrative of the inventive concepts and should not be interpreted as limiting the scope of the invention, and which are suitable for all modifications and changes falling within the scope of the invention as defined in the appended claims.

The present application is based on Application No. 2006-305757 filed in Japan on Nov. 10, 2006, and No. 2007-222844 filed in Japan on Aug. 29, 2007, the contents of which are incorporated herein by reference.

What is claimed is:

1. A battery charging cradle and mobile electronic device, wherein
    the battery charging cradle incorporates a primary coil which is connectable to an AC power source, and
    the mobile electronic device includes a secondary coil which is operable to be electromagnetically coupled to the primary coil of the battery charging cradle, and further includes a rechargeable battery which is rechargeable by electric power which is induced to the secondary coil;
    wherein the rechargeable battery has a first flat surface and a second flat surface facing the first flat surface, each of the first flat surface and the second flat surface being rectangular;
    wherein the battery charging cradle has a planar top plate on an upper side thereof, the mobile electronic device being detachably mountable on the planar top plate;
    wherein the primary coil is incorporated in the battery charging cradle such that an AC magnetic flux is induced to a specific portion of the top plate;
    wherein the mobile electronic device has a planar bottom plate to be placed on the top plate of the battery charging cradle, the secondary coil of the mobile electronic device being disposed inside the bottom plate;
    wherein the secondary coil is a coreless planar coil formed with a wire material spirally wound in a planar manner, the coreless planar coil being provided on the first flat surface of the rechargeable battery so as to be parallel to the first flat surface of the rechargeable battery;
    wherein a width of the secondary coil is larger than a thickness of the secondary coil, the width extending in a direction parallel to the first flat surface of the rechargeable battery and the thickness being orthogonal to the first flat surface of the rechargeable battery;
    wherein the battery charging cradle has a positioning portion for arranging the mobile electronic device in a predetermined position, the predetermined position being such that the primary coil is electromagnetically coupled to the secondary coil, and AC power is supplied from the primary coil to the secondary coil, and thus the rechargeable battery incorporated in the mobile electronic device is charged.

2. The battery charging cradle and mobile electronic device as recited in claim 1,
    wherein the positioning portion is a positioning protrusion provided to the top plate of the battery charging cradle, and the bottom plate of the mobile electronic device includes a positioning recess for fitting onto the positioning protrusion;
    wherein the secondary coil is arranged such that its central coiling diameter is larger than an inner diameter of the positioning recess and such that a hollow portion is provided in the center of the planar coil, the positioning recess being provided in the hollow portion; and
    wherein the positioning protrusion of the battery charging cradle is operable to be guided into the positioning recess of the mobile electronic such that the primary coil is electromagnetically coupled to the secondary coil and AC power is supplied from the primary coil to the secondary coil to charge the rechargeable battery incorporated in the mobile electronic device.

3. The battery charging cradle and mobile electronic device as recited in claim 1, wherein the entire top plate of the battery charging cradle is planar.

4. The battery charging cradle and mobile electronic device as recited in claim 1,
    wherein the positioning portion is provided on the top plate of the battery charging cradle;
    wherein a geometric figure is provided on the top plate to indicate a position for placement of the mobile electronic device; and
    wherein the mobile electronic device is carried on the top plate in alignment with the position for placement such that the primary coil is electromagnetically coupled to the secondary coil to supply the AC power from the primary coil to the secondary coil, and thus the rechargeable battery incorporated in the mobile electronic device is charged.

5. The battery charging cradle and mobile electronic device as recited in claim 1, wherein the positioning portion of the battery charging cradle is a position sensor, and the position sensor detects and indicates a position for placement of the mobile electronic device.

6. The battery charging cradle and mobile electronic device as recited in claim 5, wherein the position sensor detects the position for placement of the mobile electronic device, and when the position for placement of the mobile electronic device is appropriate, a normality indication is given by the position sensor.

7. The battery charging cradle and mobile electronic device as recited in claim 5, wherein the position sensor detects at least one of an electric current flowing through the primary coil, power consumption in the primary coil, a resonance frequency in the primary coil, and an impedance in the primary coil, so that the position of the mobile electronic device is detected by the position sensor.

8. The battery charging cradle and mobile electronic device as recited in claim 1, wherein the positioning portion of the battery charging cradle is a position sensor, the position sensor detecting a position for placement of the mobile electronic device, and when the position for placement of the mobile electronic device is out of alignment with a proper position for placement, an alarm is delivered by the position sensor to notify of a misalignment.

9. The battery charging cradle and mobile electronic device as recited in claim 1,
    wherein the mobile electronic device further comprises a spacer which is layered on the first flat surface of the rechargeable battery, the spacer being provided with a fitting-in hole for fitting the secondary coil; and
    wherein the thickness of the spacer is substantially equal to the thickness of the secondary coil such that an exterior face of the secondary coil is flush or coplanar with a surface of the spacer when the secondary coil is placed in the fitting-in hole.

10. The battery charging cradle and mobile electronic device as recited in claim 1,
    wherein the mobile electronic device further comprises a spacer which is layered on the first flat surface of the rechargeable battery, the spacer being provided with a fitting-in hole for fitting the secondary coil; and
    wherein the secondary coil is disposed in the fitting-in hole and the thickness of the spacer is substantially equal to the thickness of the secondary coil such that an exterior face of the secondary coil is flush with a surface of the spacer.

11. The battery charging cradle and mobile electronic device as recited in claim 1,
- wherein the mobile electronic device further comprises an electromagnetic shield coating that is capable of magnetically shielding a magnetic flux line received from the primary coil; and
- wherein the secondary coil is disposed on the rechargeable battery via the electromagnetic shield coating.

12. The battery charging cradle and mobile electronic device as recited in claim 1,
- wherein the mobile electronic device further comprises an electromagnetic shield coating that is capable of magnetically shielding a magnetic flux line received from the primary coil; and
- wherein electromagnetic shield coating is disposed between the secondary coil and the rechargeable battery so as to shield the rechargeable battery from the primary coil.

13. A battery charging cradle and mobile electronic device, wherein
- the battery charging cradle incorporates a primary coil which is connectable to an AC power source, and
- the mobile electronic device includes a secondary coil which is operable to be electromagnetically coupled to the primary coil of the battery charging cradle, and further includes a rechargeable battery which is rechargeable by electric power which is induced to the secondary coil;
- wherein the battery charging cradle has a planar top plate on an upper side thereof, the mobile electronic device being detachably mountable on the planar top plate;
- wherein the primary coil is incorporated in the battery charging cradle such that an AC magnetic flux is induced to a specific portion of the top plate;
- wherein the mobile electronic device has a planar bottom plate to be placed on the top plate of the battery charging cradle, the secondary coil of the mobile electronic device being disposed inside the bottom plate;
- wherein the secondary coil is a coreless planar coil formed with a wire material spirally wound in a planar manner;
- wherein the battery charging cradle has a positioning portion for arranging the mobile electronic device in a predetermined position, the predetermined position being such that the primary coil is electromagnetically coupled to the secondary coil, and AC power is supplied from the primary coil to the secondary coil, and thus the rechargeable battery incorporated in the mobile electronic device is charged;
- wherein the positioning portion of the battery charging cradle is a position sensor, and the position sensor detects and indicates a position for placement of the mobile electronic device on the battery charging cradle; and
- wherein the position sensor detects at least one of an electric current flowing through the primary coil, power consumption in the primary coil, a resonance frequency in the primary coil, and an impedance in the primary coil, so that the position of the mobile electronic device is detected by the position sensor.

14. A battery charging cradle and mobile electronic device, wherein
- the battery charging cradle incorporates a primary coil which is connectable to an AC power source, and
- the mobile electronic device includes a secondary coil which is operable to be electromagnetically coupled to the primary coil of the battery charging cradle, and further includes a rechargeable battery which is rechargeable by electric power which is induced to the secondary coil;
- wherein the rechargeable battery has a first flat surface and a second flat surface facing the first flat surface, each of the first flat surface and the second flat surface being rectangular;
- wherein the battery charging cradle has a planar top plate on an upper side thereof, the mobile electronic device being detachably mountable on the planar top plate;
- wherein the primary coil is incorporated in the battery charging cradle such that an AC magnetic flux is induced to a specific portion of the top plate;
- wherein the mobile electronic device has a planar bottom plate to be placed on the top plate of the battery charging cradle, the secondary coil of the mobile electronic device being disposed inside the bottom plate;
- wherein the secondary coil is a coreless planar coil formed with a wire material spirally wound in a planar manner, the coreless planar coil being provided on the first flat surface of the rechargeable battery so as to be parallel to the first flat surface of the rechargeable battery;
- wherein a width of the secondary coil is larger than a thickness of the secondary coil, the width extending in a direction parallel to the first flat surface of the rechargeable battery and the thickness being orthogonal to the first flat surface of the rechargeable battery;
- wherein the battery charging cradle has a positioning portion for arranging the mobile electronic device in a predetermined position, the predetermined position being such that the primary coil is electromagnetically coupled to the secondary coil, and AC power is supplied from the primary coil to the secondary coil so as to charge the rechargeable battery incorporated in the mobile electronic device;
- wherein the positioning portion of the battery charging cradle is a position sensor, the position sensor detecting a position for placement of the mobile electronic device, and when the position for placement of the mobile electronic device is out of alignment with a proper position for placement, an alarm is delivered by the position sensor to notify of a misalignment; and
- wherein the position sensor detects at least one of an electric current flowing through the primary coil, power consumption in the primary coil, a resonance frequency in the primary coil, and an impedance in the primary coil, so that the position of the mobile electronic device is detected by the position sensor.

* * * * *